(12) United States Patent
Lau et al.

(10) Patent No.: US 7,466,652 B2
(45) Date of Patent: Dec. 16, 2008

(54) AUTO-IP TRAFFIC OPTIMIZATION IN MOBILE TELECOMMUNICATIONS SYSTEMS

(75) Inventors: Richard Lau, Morganville, NJ (US); Bruce Siegell, Shrewsbury, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 760 days.

(21) Appl. No.: 10/918,256

(22) Filed: Aug. 13, 2004

(65) Prior Publication Data
US 2005/0041584 A1    Feb. 24, 2005

Related U.S. Application Data

(60) Provisional application No. 60/495,308, filed on Aug. 14, 2003.

(51) Int. Cl.
*H04L 12/26* (2006.01)
(52) U.S. Cl. ............... 370/230.1; 370/235; 370/328; 455/452.2
(58) Field of Classification Search ............. 370/235, 370/230.1, 328; 709/224; 455/445, 456.2
See application file for complete search history.

(56) References Cited

U.S. PATENT DOCUMENTS

| | | | | |
|---|---|---|---|---|
| 7,027,818 | B2 * | 4/2006 | Bos et al. ............... | 455/452.2 |
| 7,209,458 | B2 * | 4/2007 | Ahvonen et al. ........... | 370/328 |
| 2002/0036983 | A1 * | 3/2002 | Widegren et al. ........ | 370/230.1 |
| 2002/0120749 | A1 | 8/2002 | Widegren et al. | |
| 2002/0151312 | A1 | 10/2002 | Bos et al. | |
| 2003/0108015 | A1 | 6/2003 | Li | |
| 2004/0137918 | A1 * | 7/2004 | Varonen et al. .......... | 455/456.2 |
| 2004/0162077 | A1 * | 8/2004 | Kauranen et al. ........... | 455/445 |
| 2005/0097209 | A1 * | 5/2005 | McDonagh et al. ......... | 709/224 |

* cited by examiner

*Primary Examiner*—Chi H Pham
*Assistant Examiner*—Albert T Chou
(74) *Attorney, Agent, or Firm*—Philip J. Feig

(57) ABSTRACT

A system and method for the implementation of fine-grained quality of service in a mobile telecommunications environment uses an Auto-IP Policy Decision Point (PDP) to determine what traffic optimizations actions should be taken in reaction to various network conditions. The Auto-IP PDP uses as inputs information from a $G_b$ interface probe to determine the user identification of an IP data flow, information from the radio access network (RAN) network management system (NMS) regarding network congestion. The cell traffic information is passed onto a traffic analysis and processing engine, the Auto-IP PDP which maps the real-time traffic information into an n-dimensional traffic model. An automated policy decision guiding algorithm is executed on the n-dimensional traffic model and selects policy based on the traffic and cell congestion conditions, without human intervention. Additionally, a consistency check is performed to ensure that new policies are consistent with existing policies. The policy decision outcome is forwarded to the Auto-IP Traffic Optimizer that acts on the network at a point in the network ($G_i$) that is different from where traffic problem occurs in the RAN. The Auto-IP Traffic Optimizer implements the decisions of the Auto IP-PDP by performing traffic shaping, TCP window clamping or other traffic optimization procedures on a cell-by-cell basis.

11 Claims, 11 Drawing Sheets

AUTO-IP TRAFFIC OPTIMIZATION IN MOBILE TELECOMMUNICATIONS SYSTEMS

CROSS REFERENCE TO RELATED APPLICATION

This application claims the benefit of priority of U.S. provisional application No. 60/495,308 filed on Aug. 14, 2003, entitled "Dynamic Network Management In A Mobile Environment."

FIELD OF THE INVENTION

This invention is related to the provision of data services in wireless telecommunications networks. More specifically, the invention is related to a method and system for the dynamic management of network configuration and automatic optimization of network traffic in order to enable efficient use of existing wireless networks for transmission of voice and data services. By selectively applying various optimization techniques such as traffic shaping on the traffic destined for the radio access network, it is possible to reduce the overall load in that cell and subsequently improve network performance.

BACKGROUND

In telecommunications systems, such as the second generation (2G) mobile network, capacity restraints have resulted in the decline in average revenue per user thereby encouraging mobile operators to consider upgrading their network and services to a third generation (3G) network. However, the relative slow consumer response to data services, on top of the burst in the Internet bubble, have contributed to the more careful capital expenditure and the subsequent deferral of 3G deployment. Most major mobile operators now are more relying on using an intermediate 2.5G network technology, such as General Packet Radio Service (GPRS), Enhanced Data for GSM Evolution (EDGE), or Code Division Multiple Access (CDMA) Radio Transmission Technology (1xRTT) to provide data services.

The delay in building 3G networks and the reluctance for putting in more radio transmitters make it desirable to find ways to use the limited radio resource more efficiently. At the same time, mobile consumers are demanding more services and higher service quality. Operators must also be careful to avoid creating negative user experiences like those associated with the unsuccessful Wireless Access Protocol ("WAP"). All these challenges may lead to an opportunity for innovative solutions for optimizing the 2.5G network.

The scarcity in Radio Access Network (RAN) resources can seriously affect the quality of data service in wireless networks and negatively influence its acceptance. Wireless 2.5G data networks are basically overlay radio networks. Sharing of radio resource is desirable as the same radio equipment can be used both for voice and data, allowing the introduction of wireless data services without large capital expenditure. However, to meet a "good" voice quality, it can be shown that on the average, half of a Time Division Multiple Access (TDMA) time slot in a Global System for Mobile Communications (GSM) mobile system will be used by voice. In GSM systems, voice normally preempts data, therefore, less than half of the TDMA slots can be used for carrying data. This situation will be worse during peak voice usage hours.

In the mobile environment, the largest performance bottleneck occurs at the radio access network (RAN). In deferring investing large capital expenditure to upgrade the RAN and increase radio capacity, it is unavoidable that congestion will happen at the RAN. When that happens, it would be desirable to provide differential treatment for certain customer's traffic compared to others. Differentiated service suggests providing more network resource to the premium (or preferred) customer's sessions, or giving higher priority to certain traffic when degradation is unavoidable. A Quality of Service (QoS) scheme is needed to provide differentiated services. In 2.5G wireless networks, however, there is no explicit QoS control in the radio network. In 3G/UMTS networks QoS will be partially addressed, but large scale 3G deployment is not expected for several years Most service providers are motivated to provide differentiated services, as certain customers, such as corporate customers, are expected to generate a larger return on investment than non-corporate customers. Providing differentiated services is more challenging in the wireless environment than in its wireline counterpart. In additional to the scarcity in radio resource, locating mobile customers, and tracing sessions and their network resources is a fundamental challenge. Without this information, it will be very difficult to differentially control and allocate network resources with respect to a special set of premium customers.

The 3G UMTS ($3^{rd}$ Generation Universal Mobile Telecommunication System) is a proposed architecture that supports end-to-end Quality of Service (QoS). It is based on Internet Protocol (IP) QoS and a QoS policy interface ($G_o$) defined between the Gateway GPRS Support Node (GGSN) and a new function called Policy Control Function (PCF). The PCF is part of a module called P-CSCF (Policy—Call State Control Function), which is part of the IMS (IP based Multimedia Service Platform) architecture.

The UMTS QoS support is based on IP QoS mechanisms including DiffServ, Intserv, Resource Reservation Protocol (RSVP), and QoS Policy management via the Common Open Policy Service (COPS) protocol from the Internet Engineering Task Force (IETF). In the current UMTS system, the higher level QoS request is mapped into policies at the PCF module. Policy is conveyed between the PCF and the IP BS (Bearer Service) manager located in the GGSN and the mobile terminal. The IP BS QoS requirement is further mapped into UMTS QoS requirement at the Policy Decision Point (PDP) Context level. Support of QoS policy is via the PDPContext setup. During the PDPContext setup, the GGSN will request an authorization from the PCF module. After authorization, the PCF sends back a decision to the GGSN where the policy is enforced. The GGSN then generates a "Create PDP" Response back to the SGSN, which then sends an "Activate PDP" message to the mobile station to complete the PDP set up. It is also possible to change the QoS Policy after the initial set up. This can be initiated by either the MS or the PCF.

QoS control in 3G UMTS is driven by the IMS architecture. UMTS has added many QoS capabilities into the network. It relies mainly on IP QoS and a QoS Policy Decision Point (PDP). It has moved the Admission Control function outside the SGSN (in release 99) to be now located in the PCF (Release 5). This provides a very flexible and powerful architecture with respect to admission control, which was not accessible to OSS in 2.5G systems.

Providing UMTS QoS capabilities is expected to be an evolutionary process. However, early form of these capabilities can be implemented with a simple GGSN and a Policy Decision Point architecture, not necessary with a full-fledged $G_o$ interface. Thus, it is important to be able to migrate from a strategy in which many QoS capabilities can be provided in the near term (1-2 years) with an evolution towards the ultimate UMTS QoS capability.

The current problems to be addressed are the radio resource scarcity and service differentiation issues. In 2.5G wireless networks, there is no explicit QoS control in the radio network. Although 3G/UMTS network provides a lot more QoS capabilities, 3G deployment is not expected in large scale for at least three years. However, even the current 3GPP UMTS Release 5 does not adequately address the quality of service needs as there is still no QoS in the RAN even in 3G.

It has been generally concluded that one effective way to deal with the scarcity in radio resource is via digital compression of the source content, or by using software accelerator (another term for compression). This is particularly useful as RAN congestion is expected to happen mostly in the downlink (from server to MS direction) for most data applications. Another reason for compression is that mobile terminals come in all sizes and many of them do not require a full resolution display. This provides much flexibility and an opportunity for significantly reducing the data rate requirement for many mobile terminals. Compression alone, however, will not be enough to save the bandwidth necessary to provide the various services desired by customers.

With regard to the QoS issue in mobile networks, many QoS control mechanisms have been proposed in the past, including Differentiated Services (DiffServ), Integrated Services (IntServ) via RSVP, Multi-Protocol Label Switching (MPLS) and virtual circuit technologies such as Frame Relay (FR) and Asynchronous Transfer Mode (ATM). Whereas each of these technologies has its own merits and shortfalls, mobile operators have converged on IP as the fundamental protocol that is considered most ubiquitous and is the focal point for relating customer session service requirements to lower layer network implementation of QoS. Between the two QoS mechanisms available in IP, DiffServ has come out to be the more desirable mechanism over IntServ. The Intserv model requires state information for every IP flow or session in a router, which causes scalability problem that renders its implementation impractical. DiffServ, on the other hand, only requires each router to handle a small set of QoS classes and is thus considered to be a good compromise between the per-flow Intserv and regular "best of effort" service IP DiffServ is a common mechanism for providing quality of service in IP networks. DiffServ requires each IP router to handle a small set of QoS classes and prioritizes the traffic based on these classes. The DiffServ service classes are based on several header fields in IP packets: IP source and destination addresses, IP protocol field, IP port number, and DiffServ code points (DSCP) or IP precedence (Type of Service, TOS) bits. DiffServ can provide QoS control using traffic shaping/rate limitation, policy based routing, and packet dropping policy. DiffServ's decision-making and policy enforcement is performed at each router (each hop the packet traverses) based on information local to the router. In the case of 2.5G networks (e.g., GPRS), the last hop for a packet destined for a mobile host is the gateway between the wireless core network and the IP network (the GGSN, in the case of GPRS). However, congestion is most likely to occur in the Radio Access Network (RAN), which is not directly adjacent to the IP gateway. Thus, the gateway does not observe the congestion and cannot use DiffServ to address the congestion problem.

The Internet DiffServ architecture provides powerful mechanism for controlling QoS. However, there are a number of issues that warrant careful consideration before it can be used successfully for mobile networks. The DiffServ architecture focuses around a local device, such as a router or bandwidth broker as a key QoS policy Enforcer. However, in many scenarios, the triggering events, such as congestion in the RAN, are remote from the enforcement point. It is important that QoS policy decision be made properly taking into account the relationship between the cause (congestion point) and the cure (PEP). The "cause and effect" of QoS policy and enforcement is hard to verify and a separate OSS structure is required to convince providers that they are getting what was promised. The linkage between IP QoS and customer and service level SLA is not defined and the mapping is ad-hoc and complicated. This requires operators to "understand" what is the right QoS policy and how should the policy be coordinated among multiple QoS policy enforcement points so that end-to-end QoS goals are satisfied.

Therefore, it would be desirable to have a QoS policy enforcement and traffic optimization system that overcomes the shortfalls of DiffServ and Intserv.

Furthermore, it would be desirable to have a system and method that enables optimal use of RAN resources.

Additionally, it would also be desirable to have a method and system that is able to provide for fine-grained QoS in a mobile network thereby providing quality of service on a user-by-user basis without having the overhead problems created by a session-by-session system such as Intserv.

Furthermore, it would be desirable to have a method and system capable of implementing policy based QoS to meet various user demand.

Also, it is desirable to have a method and system enables controlling, shaping, and optimization of traffic at a point in the network away from the point of RAN congestion.

Finally, it would be desirable to have a method and system capable of supporting a wide-range of different access networks.

SUMMARY

The present invention provides a method and system for the automatic optimization of traffic flows in a wireless networks in order to maximize the use of the available bandwidth in the RAN. The present inventive method and system addresses these questions by providing a solution to the RAN congestion and service differentiation problems based on resource optimization destned for mobile stations at a point on the interface between the mobile network and the Internet. The traffic profile and congestion state of each cell in the RAN is continuously monitored. This is achieved via a probe at the $G_b$ interface (a $G_b$ probe) and deep packet processing and correlation at one or more points in the network. The cell traffic information is passed onto a traffic analysis and processing engine, the Auto-IP PDP that maps the real-time traffic information into an n-dimensional traffic model. An automated policy decision-guiding algorithm is executed in the Auto-IP PDP on the n-dimensional traffic model and policy is selected based on the traffic and cell congestion conditions, without human intervention.

The policy decision outcome is acted upon by the Auto-IP Traffic Optimizer that is at a point in the network ($G_i$) that is different from where traffic problem (RAN) occurs. This is important for the reasons including scalability, availability of QoS controlling mechanism, and backward compatibility.

The present invention performs QoS optimization on a per cell basis. This idea is in contrast to the IP DiffServ which applies QoS globally on a per class basis, or Integrated Service (IntServ), which is defined on a per flow or session basis.

The algorithm allows optimization of all the IP flows that destined for each cell based on the traffic in that cell. It therefore allows a granularity of optimization that is not available in either DiffServ or IntServ mechanism.

Design and operations of policy is vastly simplified by introducing an automated policy-checking algorithm that checks the consistency of policies without the equivalence of expert analysis. This automated checking also avoid the difficult problem of policy feature interaction.

DETAILED DESCRIPTION

Figure 1:
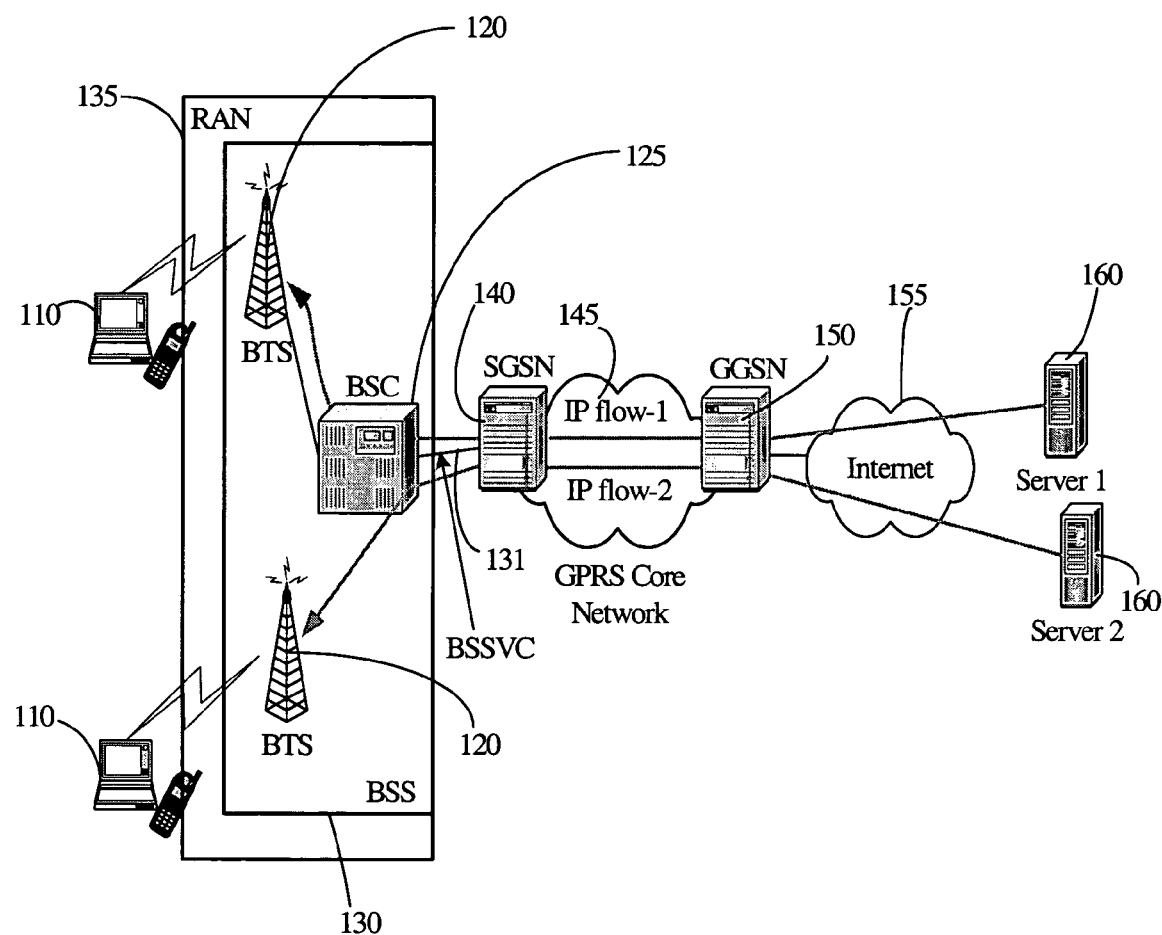
FIG. 1 is a depiction a typical GPRS/UMTS network architecture.

FIG. 1 depicts a typical GPRS/UMTS mobile network. Mobile stations 110 communicate with the network by sending and receiving signals to a Base Transceiver Station (BTS) 120. Each BTS 120 is in communication with a Base Station Controller (BSC) 125 that control one or more BTS devices. A plurality of BTS devices and BSC devices are often referred to in the aggregate as the Base Station System (BSS) 130. Additionally, the radio access network (RAN) 135 would include the BSS and the signals transmitted through the air to and from the MS devices 110.

Through the BSS Virtual Circuit (BSSVC) 131, BSC 125 is in communication with the Serving GPRS Support Node (SGSN) 140 that performs mobility and data session management for Mobile Stations 110. SGSN 140 communicates with the Gateway GPRS Support Node (GGSN) 150 through the GPRS core network 145. GGSN 150 serves as the gateway between the GPRS core network 145 and external Packet Data Networks such as the Internet 155. GGSN 150 is in communication with a plurality of servers 160 through the Internet 155. Servers 160 store the web pages or other information desired by the users of the mobile stations 110.

Much of the congestion in the network occurs at the interface between the RAN 135 and the mobile stations 110 due to the limited bandwidth available in the cellular system. In the downlink direction, the BSS 130 maintains a buffer for each BSS virtual circuit (BSSVC) 131. When the buffer is full, the packet will be dropped. There is no priority queuing implemented at the BSS 130. In the uplink direction, there are no buffers as there is not expected to have much traffic in the uplink direction. When a packet is dropped, a message will be sent from BSS 130 to the SGSN 140 for the purpose of flow control, so that SGSN may slow down sending packet to the BSS. Overall, no priority or QoS differentiation is implemented at BSS or SGSN to deal with the congestion at the RAN. In addition, the RAN congestion is not going to be experienced by the GGSN 150. So by applying a QoS policy at GGSN based on information local to the GGSN (as in DiffServ) will not mitigate the RAN congestion problem.

Even though congestion at the interface between the RAN 135 and the mobile stations 110 is too remote from the GGSN for the GGSN to "feel", the GGSN 150 is the best place to apply QoS control because the GGSN is the first IP hop from the mobile station from an Internet IP routing architecture viewpoint. Other nodes such as SGSN 140, BSC 125, BTS 120, or other nodes in the GPRS core network 145 are all working in the layer below the IP transport layer. This includes the IP transport layer that carries the GTP. These lower layers are not ideal for providing QoS control because it makes correlation with user identification harder. On the other hand, the GGSN 150, being the first hop for IP, functions as an edge IP device and is thus the best place for QoS policy enforcement. Note that in an all IP network, or so-called IP RAN (such as one by Nokia), the same principle applies: the first hop is the place to apply QoS control.

Because the GGSN 150 is the logical place for enforcing QoS policy, there are 3 fundamental issues to address to create QoS policy enforcement at the GGSN. The GGSN 150 must be made aware of congestion at the RAN 135. The user of the mobile station 110 requesting a service must be associated with the IP flow of data supporting that service and the GGSN 150. Finally, the user of the mobile station 110 must be tracked and correlated with the congestion or other problems discovered in the radio network.

A problem with making the GGSN 150 aware of delay at the RAN is caused by the aggregate buffer size in the components between the GGSN 150 and the cell tower, BTS 120. The deep buffer TCP problem in a single TCP session can result in significant delay. The BTS 120, BSC 125 and SGSN 140 contain between 50 and 200 Kbytes of total buffer. Typically, TCP's congestion control mechanisms can allow buffer growth up to 64 kilobytes (kbytes) per TCP session. For a 50 kilobit per second (kbps) cell, 64 kbytes translates to over 10 seconds of buffer delay. With multiple TCP sessions, the deep buffer problem can result in significant delays, and every new packet is delayed by existing sessions. Thus, time-critical traffic, such as voice traffic, sharing the resources with TCP traffic can experience delays of up to tens of seconds. Interactive sessions, such as web downloads, also experience the added latency.

Figure 2:
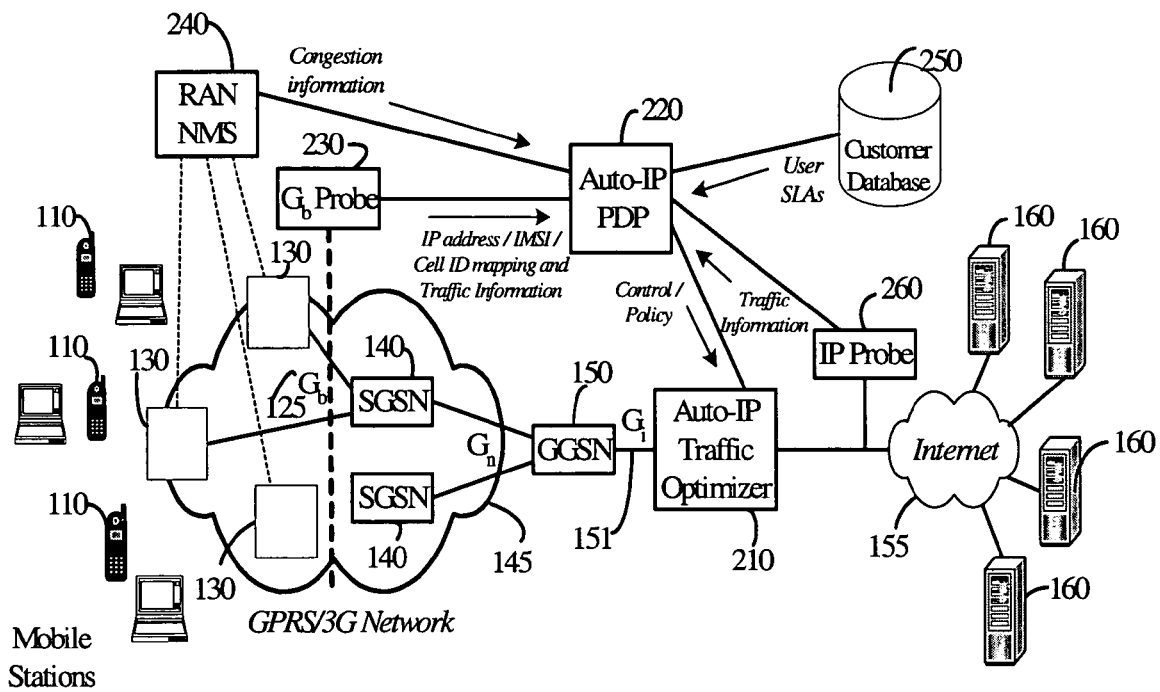
FIG. 2 is a depiction of the elements of the system of the present invention as deployed in the GPRS/UMTS architecture.

Referring to FIG. 2, an embodiment of a system for the automatic optimization of IP traffic in a mobile network in accordance with the present invention includes an Auto-IP Traffic Optimizer 210. The Auto-IP Traffic Optimizer 210 can be placed on the $G_i$ interface 151 immediately upstream of the GGSN 150, or its functionality can be built into the GGSN 150 itself. The Auto-IP Traffic Optimizer 210 is configured/controlled by a separate device that collects information from the RAN 135 and various other sources such as a $G_b$ probe 230 to make decisions for controlling the traffic going into each RAN cell (or cell sector, depending on the resolution of information available). In the present invention this device is called Auto-IP Policy Decision Point (Auto-IP PDP) 220 based on policy terminology. The Auto-IP Traffic Optimizer 210 is a type of Policy Enforcement Point (PEP). It is also possible that the functions of the Auto-IP Traffic Optimizer 210 and the Auto-IP PDP 220 could be incorporated into a single device.

The Auto-IP PDP 220 and the Auto-IP traffic Optimizer 210 are most likely to be embodied in software routines that implement the described functionality, but certain portions could be implemented in hardware or a combination of special-purpose hardware and software if necessary to improve the speed of performance. The software implementing the Auto-IP PDP 220 and Auto-IP Traffic Optimizer 210 could be executed on a variety of general purpose computers and could be ported to operate in a variety of operating systems including, but not limited to, the IBM AIX platform, other proprietary UNIX based operating systems, the open source Linux operating system and the Microsoft Windows operating system. The type of general-purpose computer used to execute the software modules comprising the Auto-IP PDP 220 and Auto-IP Traffic Optimizer 210 is not crucial to the implementation of the present invention.

The Auto-IP PDP 220 uses inputs from the RAN network management system (NMS) 240. The RAN NMS 240 enables the configuring, controlling and monitoring of the various components in the one or more BSSs 130. The RAN NMS 240 provides information regarding network traffic congestion at the RAN interface to the mobile stations 110.

Customer database 250 also provides input to the Auto-IP PDP 220 in the form of customer subscription information, including, service level agreements of various customers or customer groups. This information enables Auto-IP PDP 220 to develop QoS policies based on subscription information.

IP Probe 260 is used to monitor the quantity of IP traffic on a per IP session basis and provide input to the Auto-IP PDP 220 with regard to the IP traffic mix and the types of traffic in the mix (i.e., voice, data, web-access, e-mail, etc.). IP Probe also can be used to measure round-trip delay in the network for use in some policy enforcement mechanisms (e.g., TCP Window Clamping).

The $G_b$ probe 230 taps into the $G_b$ interface 125. A generic probe usually collects various pieces of information for performance analysis. For the purposes of the present invention, a $G_b$ probe capable of collecting the information in Table 1 is desired. Minimally, the probe should be able to provide a mapping between a subscriber—most likely identified by the IMSI (International Mobile Station Identifier)—the assigned IP address for the current session, and the identity of the cell where the subscriber is currently located. The $G_b$ probe 230 is also in a position to collect information regarding the IP traffic max (types and quantities) in each cell. The $G_b$ probe 230 should be capable of storing and updating this information with respect to a cell. An example of an available $G_b$ probe is the Steleus ProTraffic $G_b$ probe.

TABLE 1

| | |
|---|---|
| Cell Congestion condition | Severe, high, medium, mild, none. |
| Cell Identity | Current cell ID where MS resides |
| For all the users affected by the congested cell, following information is needed: | |
| IMSI | International Mobile Station Identifier |
| MSISDN | Mobile Station ISDN number |
| SGSN number | IP address of SGSN |
| GGSN Address | IP address of GGSN in use |
| PDPContext Identifier | Identifies the current PDPContext |
| PDP State | Active or inactive |
| PDP type | IP, PPP, or X.25 |
| IP address | IP address of Mobile Station |

TABLE 1-continued

| | |
|---|---|
| APN in use | Access Point Name to external data network |
| QoS profile requested | QoS requested for the current PDP |
| QoS profile negotiated | QoS granted by the network |

The Auto-IP PDP 220 selects policies to optimize performance of multiple applications sharing a limited resource such as the bandwidth of a cell in a GPRS network. This is accomplished by identifying the different traffic types that share the bandwidth and by creating an n-dimensional space described by the traffic profile. A number of these n-dimensional traffic profiles (called templates) are created and used according to varying criteria in order to satisfy various business requirements. Each n-dimensional traffic space consists of n axes. The number of axes is determined by the number of traffic types. Different templates may use different traffic types for the axes, and it may have different number of axes.

For a particular template, each axis represents a traffic type and a traffic descriptor (i.e., bandwidth or the number of sessions). The following are example of the axes of traffic template: bandwidth of premium traffic; bandwidth of best effort traffic; number of sessions in premium class; number of sessions in best effort class. The above example describes a 4-dimensional space, and can be used for offering service level agreements ("SLA") for guaranteeing QoS for the premium traffic profile, for example, an SLA for Premium QoS with bandwidth peak of 50 kbps and maximum number of VoIP session equal to 10 simultaneous calls.

For traffic control, the n-dimensional space is partitioned into a number of regions (or states). The regions are defined according to network traffic states as well as other business needs. At any time, the current conditions in the network can be represented by a state in the n-dimensional traffic space. Some states, called "acceptable states", represent conditions of the network for which the traffic constraints are met. Other states, called "unacceptable states", represent network conditions where the constraints are not met. In some cases, called "sub-optimal states", the traffic constraints are met, but resources are not used efficiently.

For each state, a set of policies is identified that can be activated either to encourage movement of the network from an unacceptable or sub-optimal state to an acceptable or more acceptable state. Generally, movement between states occurs naturally as traffic entering the network increases or decreases, but policies can encourage the movement between states. In some cases, there may be states that cannot be reached due to the policies activated in the other states, such as admission control policies. An example of a partitioned network state space graphically is set forth in FIG. 3. The network states and transitions are also represented as a state transition diagram in FIG. 4. For the cases where certain states cannot be reached, these states are omitted from the state transition diagram.

The condition of the network and the behavior of the Auto-IP PDP 220 are modeled with a Finite State Machine (FSM). The Auto-IP PDP 220 maintains the state of the FSM and bases its actions on the FSM. The Auto-IP PDP 220 monitors the current condition of the network using information from the probes and optionally from the RAN NMS 240. The $G_b$ probe 230 determines mapping information and either the $G_b$ probe or the IP Probe 260 can determine the traffic mix (types and quantities) in each cell. The RAN NMS 240 can provide information regarding congestion status of cells. Auto-IP PDP 220 maps the current condition of the network to one of the regions in the n-dimensional space described above, and identifies the corresponding state of the FSM. Each time the FSM enters a new state, the Auto-IP PDP 220 performs any actions associated with the state, with no need for human interaction. The actions may enable policies to encourage (e.g., an admission control policy) or cause (e.g., a traffic shaping policy) movement to a different state (from an unacceptable state to an acceptable state or from a sub-optimal acceptable state to an non-sub-optimal acceptable state). In some cases, the actions may disable policies that are no longer necessary.

Figure 5:
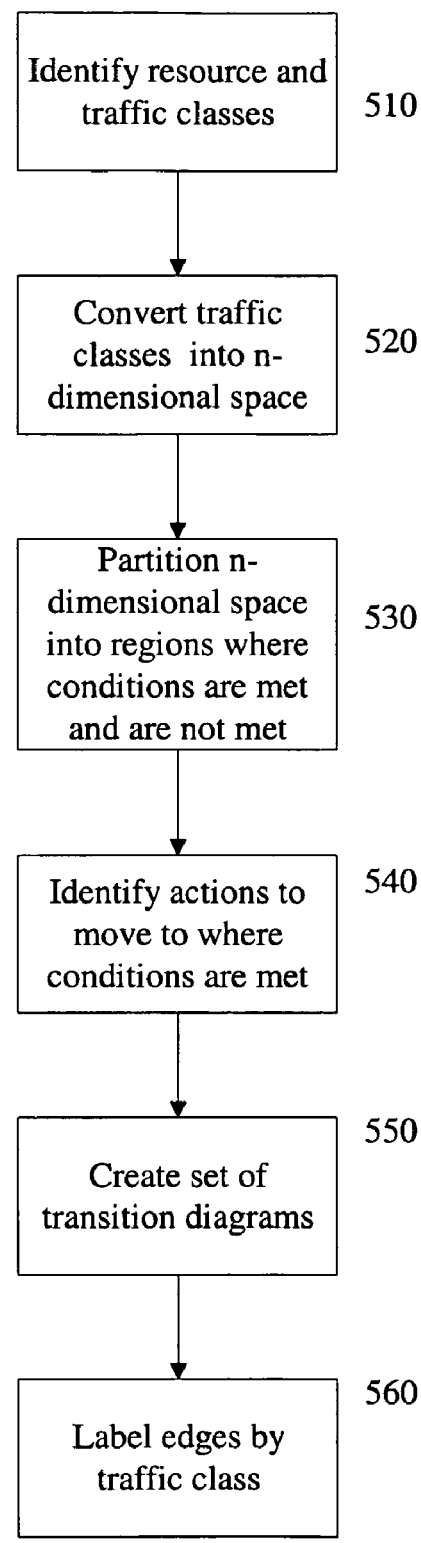
FIG. 5 is a flow diagram depicting the process for developing the finite state machine for use in the Auto-IP PDP of the present invention.

The FSM for automated use as part of the automated policy decision-guiding algorithm in the Auto-IP PDP 220 is created using the following process depicted in FIG. 5. At step 510, the total quantity of the resource to be managed (e.g., the total bandwidth/capacity of a GPRS cell) and the traffic classes that must share the resource are identified. Next at step 520 the set of traffic types are converted into an n-dimensional space where n is the number of traffic types, and the axes represent the amounts of traffic (the resource usage) of each type. At step 530, the n-dimensional space is partitioned into regions representing conditions of the network for which traffic constraints are met or not met. The partitions may be based on SLA thresholds or implicit traffic constraints (e.g., a particular real time application needs a specified bandwidth to operate properly; or a mix of traffic types only performs well if a particular balance of the types is maintained). Each region is named (e.g., A, B, C, 1, 2, 3, etc.).

For each state that does not meet traffic constraints (or meets traffic constraints sub-optimally), a set of actions is identified at step 540 that will move (or encourage movement of) the network into a state that does meet the traffic constraints. Next a state transition diagram is created at step 550 with nodes representing each of the regions/states and with edges between nodes representing adjacent regions. Finally, at step 560 each edge is labeled with the type of traffic that causes the transition. For the edges that move the network from an unacceptable state to an acceptable (or more optimal) state (identified in step 540), also label the edge with the name of the action that causes or encourages the transition.

Figure 3:
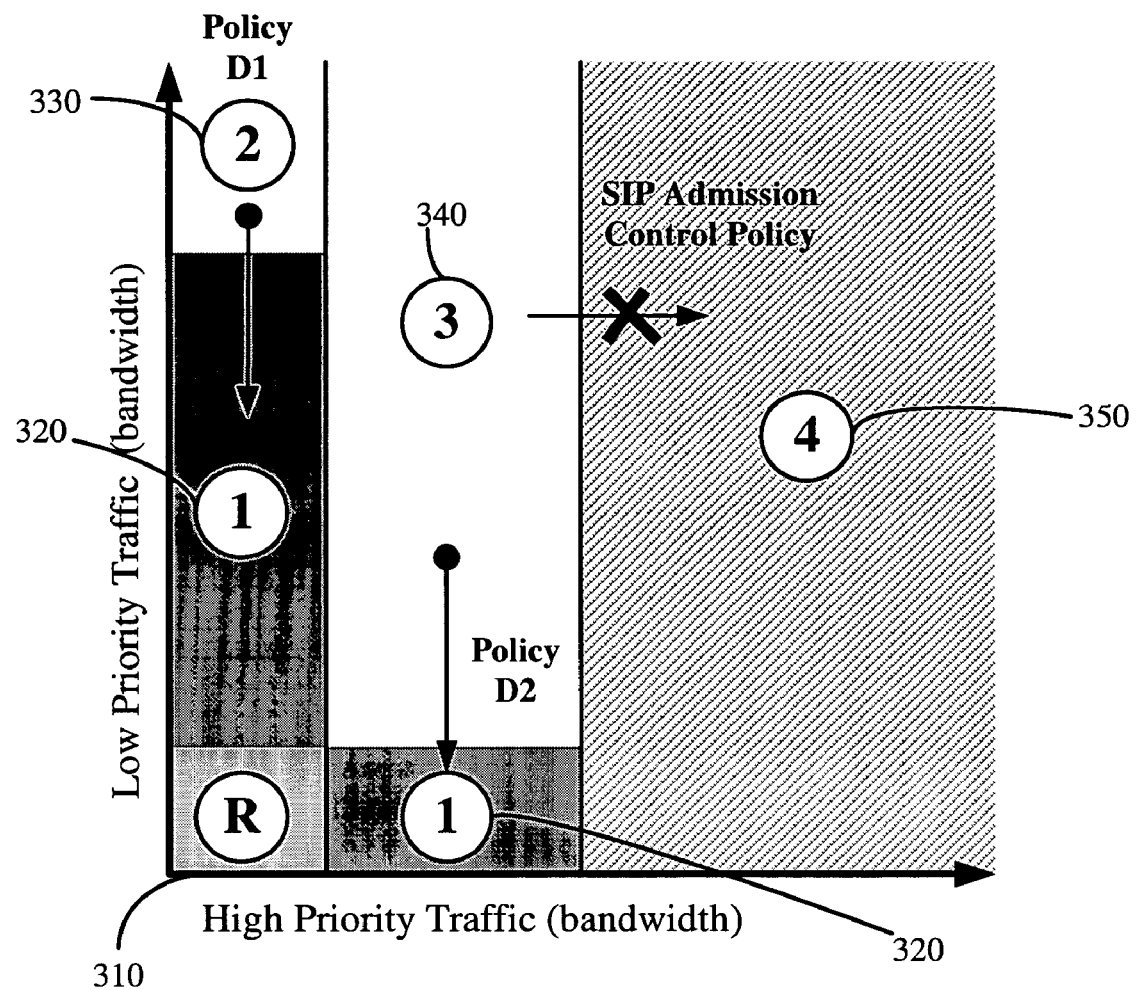
FIG. 3 is a graphical depiction of an example of a partitioned network state space.

An example of this process is set forth below. In this example, a high-priority traffic class and a low-priority traffic class have been identified. The high priority traffic should be protected so that it has little delay or jitter. When there is a small amount of high priority traffic, a large amount of low priority traffic can be tolerated. However when the high priority traffic exceeds a threshold, the low priority traffic should be severely limited so it cannot interfere with the high priority traffic. Also, at all times, the amount of high priority traffic must be less than the total cell capacity. The network state space corresponding to these constraints is shown in FIG. 3. Five states have been identified including a reset state, R 310. In the reset state, R 310, there is so little traffic that no policies need to be enabled, and previously enabled policies can be disabled or replaced by a default policy. In state 1 320, the traffic constraints are met, so whatever policies have been enabled can remain enabled. In state 2 330 and state 3 340, there is too much low-priority traffic, and the low-priority traffic must be limited to an appropriate level to prevent interference with the high priority traffic and in state 4 350, there is too much traffic of all kinds.

Figure 4:
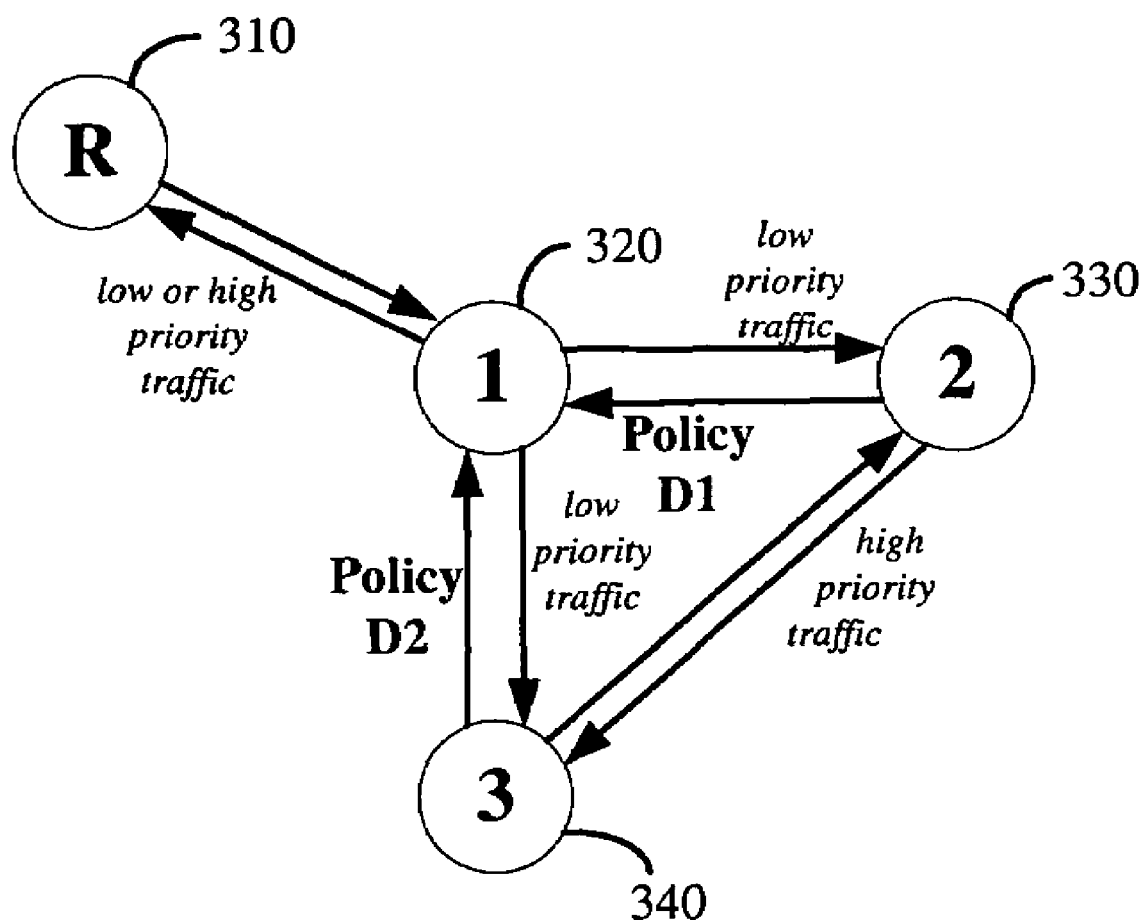
FIG. 4 is a depiction of the network states and transitions of the example of FIG. 3 as represented in a state transition diagram.

The total limit on high priority traffic can be enforced using admission control (e.g., based on the Session Initiation Protocol, SIP); this will prevent the network from entering state 4 350. The limits on low-priority traffic must be enforced using IP traffic shaping to move the network out of state 2 330 (Policy D1) and state 3 340 (Policy D2). The corresponding Finite State Machine for this example is shown in FIG. 4.

Table 2 sets forth the description of policies implemented in the Auto-IP PDP 220 for this high-priority/low-priority traffic mix.

TABLE 2

| Policy | State | Auto-IP Actions |
|---|---|---|
| Common | All states | SIP-based Admission Control limiting high-priority traffic. Prevents State 4 from being reached. |
| Reset | R (low traffic) | Remove previous policies |
| D1 | 2 (low high priority traffic, too much low priority traffic) | Limit low priority traffic to upper limit using IP Traffic Shaping |
| D2 | 3 (moderate high priority traffic, too much low priority traffic) | Limit low priority traffic to lower limit using IP Traffic Shaping' |
| No change | 1 (acceptable amounts of high and low priority traffic) | No change in policy |

Figure 6:
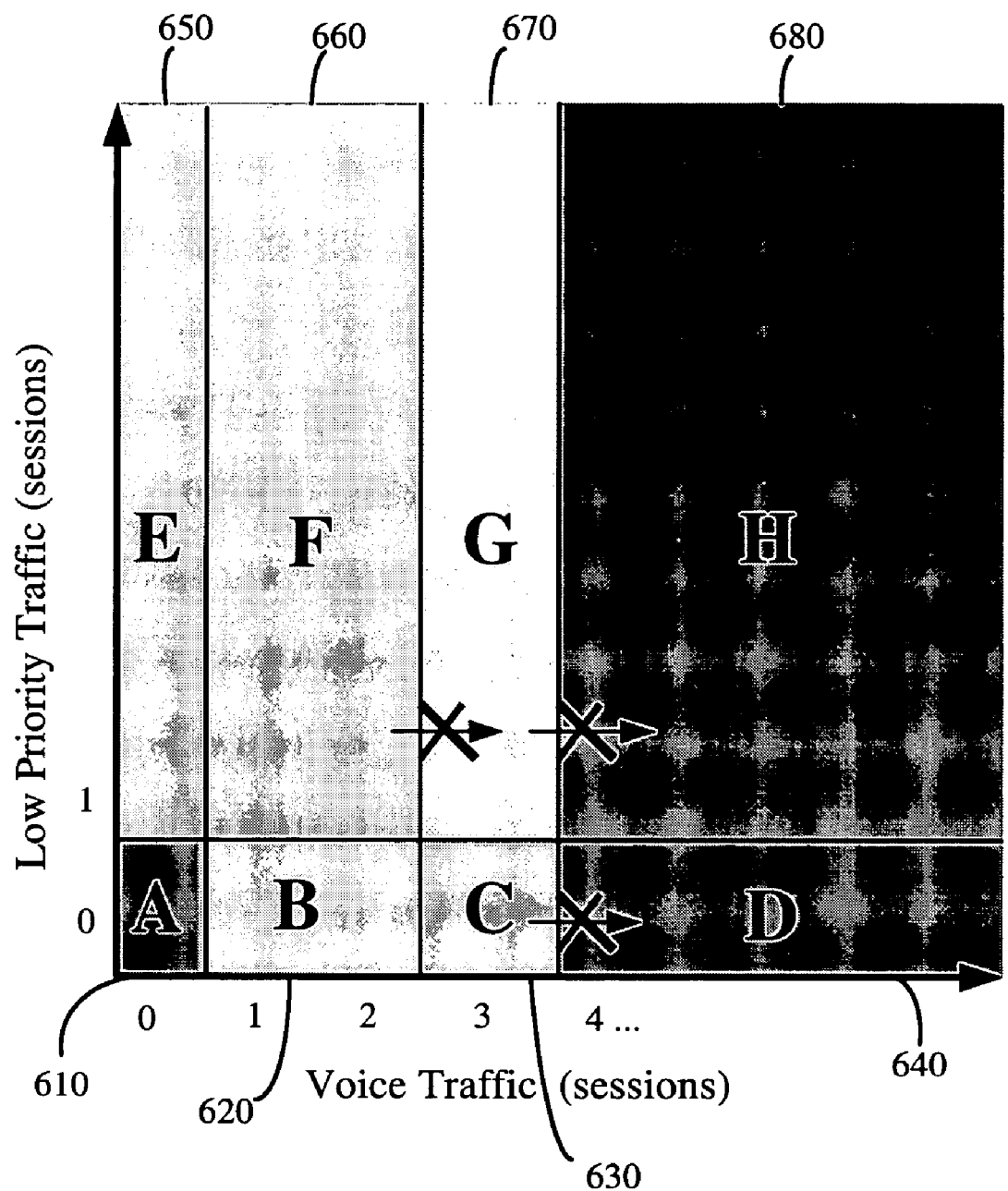
FIG. 6 is a graphical depiction of a further example of a partitioned network state space.
Figure 7:
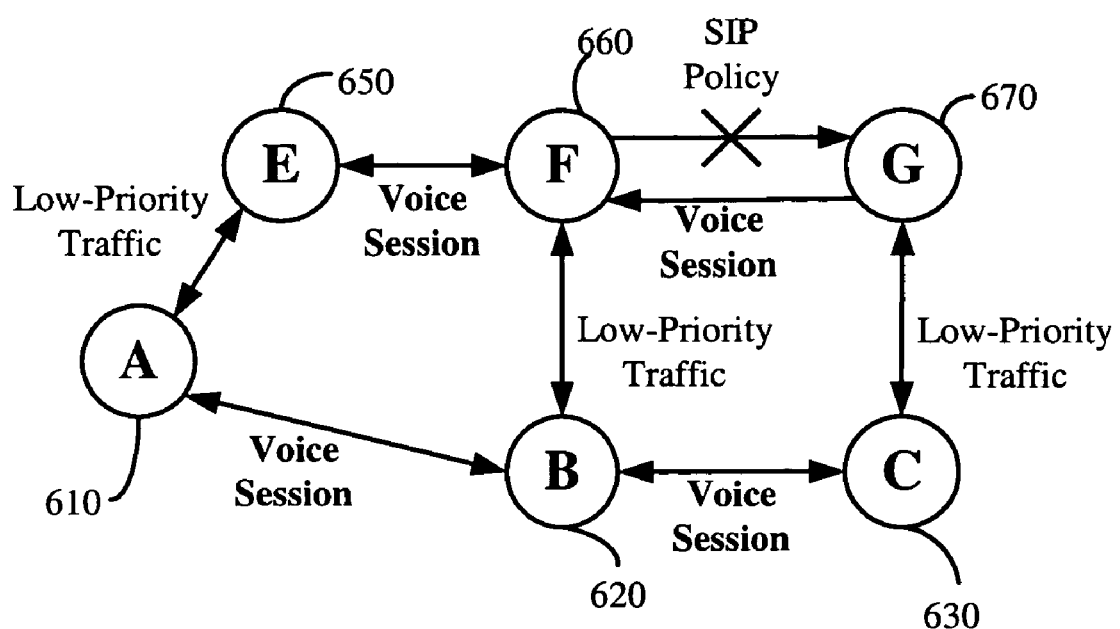
FIG. 7 is a depiction of the network states and transitions of the example of FIG. 6 as represented in a state transition diagram.

In a second example for which FIG. 6 provides a diagram of the network state space, there are two traffic classes—low-priority traffic and voice traffic (with minimum bandwidth requirements). For this case, the network state space is based on numbers of sessions rather than bandwidth. State A 610 is the default state in which there is no traffic and low-priority traffic is allowed to use the full capacity of the cell. When there is no low-priority traffic as in state B 620 and state C 630, the bandwidth is allotted for up to 3 voice sessions. However, when there is low-priority traffic, such as in state E 650 and state F 660, bandwidth is reserved for only 2 voice sessions so that there is bandwidth available for the low priority traffic. Admission control (based on SIP) is used to prevent more voice sessions than the 2 or 3 permitted from entering the network. Consequently, state D 640 and state H 680 cannot be reached due to the SIP admission control policy. In the case where 3 voice sessions are already using the network when low priority traffic begins, state G 670, existing sessions will not be preempted. In this case, the SIP policy is changed so that only 2 voice sessions can enter, but allow the existing 3 voice sessions to continue until one or more of them finishes. At that point, resource allocation for voice is reduced from 3 sessions to 2. FIG. 6 depicts the network state space for this example and FIG. 7 depicts the finite state machine for the same. The actions to be taken in the various states are set forth in Table 3 below.

TABLE 3

| State | Description | Action |
|---|---|---|
| A | Default state - no traffic | SIP 3-voice policy, No-voice shaping policy. |
| B | 1 or 2 voice streams with no low priority traffic | SIP 3-voice policy, 3-voice shaping policy. |
| C | 3 voice streams with no low priority traffic | SIP 3-voice policy, 3-voice shaping policy. |
| D | More than 3 voice streams with no low priority traffic | Can't be reached due to SIP admission control. |
| E | Low priority traffic with no voice streams. | SIP 2-voice policy, No-voice shaping policy. |
| F | 1 or 2 voice streams with low priority traffic | SIP 2-voice policy, 2-voice shaping policy. |
| G | 3 voice streams with low priority traffic | SIP 2-voice policy, 3-voice shaping policy. |
| H | More than 3 voice streams with low priority traffic | Can't be reached due to SIP admission control. |

The Auto-IP PDP 220 also executes an automatic policy consistency-checking algorithm as described below. First the notation for describing the policies deployed in the Auto-IP PDP 220 will be described. A policy, Pi, is represented as:

$$Pi: \text{If } C\text{-}i = [C1 \text{ and } C2 \text{ and } \ldots] \text{ is true then Apply Action } A\text{-}i = \{A1, A2 \ldots\} \quad (1)$$

where index i refers to the ith policy. C-i is called policy condition or simply condition. C-i consists of a number of sub-conditions, C1, C2 . . . Cn. Each sub-condition can be expressed as follows:

$$Cx: \{\text{a set of elements } \{e\} \text{ satisfying condition } cx\} \quad (2)$$

Cx can be evaluated as true or false. The following are examples of elements {e} and sub-conditions ci:
e—PDP sessions C1: Cell ID within the range of 1-1000.
C2: APN=Company.gprs.com
C3: Subscribed QoS=Level 5.
C4: Weekdays from 9-10 am.
C5: Congested radio cells Suppose condition C={C1 and C2 and . . . C5} is true. This means that condition, C, describes the set of PDP sessions which are in the congested cells with cell IDs that are within the range of 1-1000, and having an APN=Company.gprs.com, and with subscribed QoS=level 5, during any week days from 9-10 am.

The second part of the policy statement involves a set of actions A={A1, A2 . . . }, which describes a set of "operations" that apply to a set of elements such as IP sessions. Examples of Action operations are:
A1: Rate Limit
A2: TCP window clamping
A3: Content compression
A4: Admission Control
A5: Blocking The set of elements in the action statement (e.g., the set of IP sessions) on which the operations Ai are applied is called "Actioned group (Ag)". An example of an "Ag" (for Ipv4) is given below:

Ag: {Direction=Downlink, IP source address=128.96.100.10, IP destination address=Any, Source port number=Any, Destination Port number=Any, Internet Protocol=6 (TCP), TOS=01010000}

An example of the action is:
Action: Limit the bandwidth of the IP sessions within the congested cell x that correspond to PDPContexts with Subscribed QoS=5 to 5 Kb/s each.
To execute this action, the congested cell x and the Actioned group of IP sessions with Subscribed QoS=5, are first identified. Then the Rate Limit action is applied to this Ag.

Putting the whole policy together, the Auto IP-PDP 220 determines the actions to apply based on the conditions:

$$\text{If } C\text{-}i = [C1 \text{ and } C2 \ldots] \text{ is true then Apply A1 to Ag-1,} \\ A2 \text{ to Ag-2} \ldots \quad (3)$$

The Auto-IP PDP 220 automates the checking of the consistency of a policy compared with respect to an existing set of consistent policies as explained in the following example. Given two policies P1 and P2, it must be determined whether P1 and P2 are consistent or inconsistent. Table 4 shows two policies with their associated conditions and actions. The associated actions are applied to two action groups: Ag-1 related to all the IP sessions corresponding to the congested cell and Ag-2 related to all the VoIP sessions.

TABLE 4

| Policy | C1 Cell ID | C2 IMSI | C3 APN | C4 Cell congestion | C5 Time Date | C6 Subs. QoS | C7 Neg. QoS | | Ag-1 | Ag-2 |
|---|---|---|---|---|---|---|---|---|---|---|
| P1 | 256 | All | X | Yes | 12-1 pm | 1 | X | A1 | Y | |
|  |  |  |  |  |  |  |  | A2 |  | Y |
|  |  |  |  |  |  |  |  | A3 |  |  |
| P2 | X | 1-10 | t.gprs | X | X | <2 | 1 | A1 | Y | |
|  |  |  |  |  |  |  |  | A2 |  |  |
|  |  |  |  |  |  |  |  | A3 |  | Y |
|  |  |  |  |  |  |  |  | A4 | Y |  |

Figure 8A:
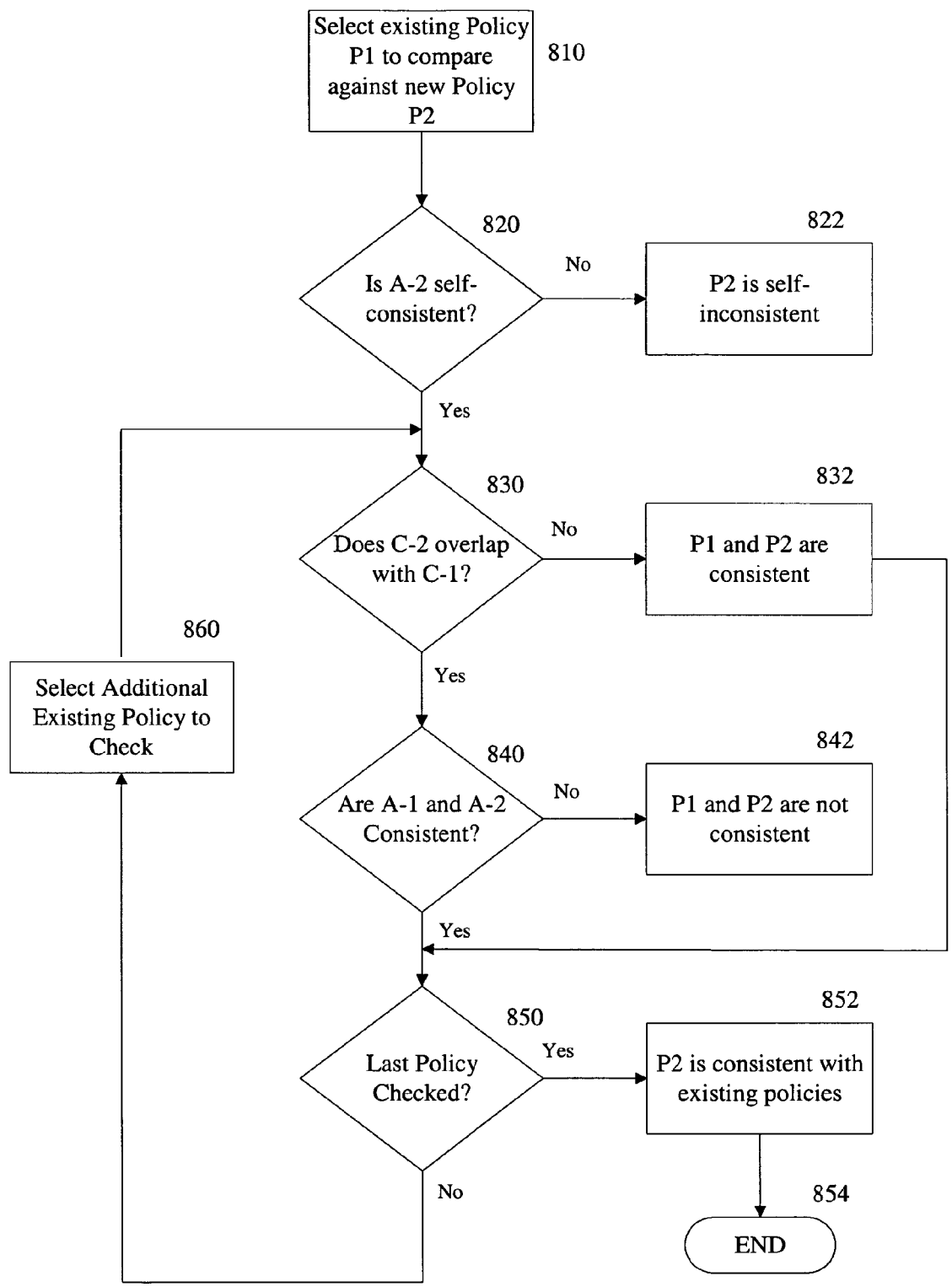
FIGS. 8a and 8b are schematic diagrams of the consistency checking algorithm of the Auto-IP PDP of the present invention.

The Auto-IP PDP 220 executes the automatic policy consistency-checking algorithm as follows. Start with a set of existing policies (assumed to be consistent). A new policy P2 is to be checked against the existing policies. Select a policy P1 from the set of existing policies. Checking of existing policy P1: C-1→A-1 against new policy P2: C-2→A-2 starts with step 810 of FIG. 8a which selects an existing policy P1 against which to compare the new policy P2. In the first checking step, step 820, the self-consistency of A-2 is checked once. This is achieved by first identifying the sets of overlapping actioned groups (actioned groups with common elements) of A-2. An example set of overlapping action groups for A-2, named Ag-01 and Ag-02, is shown in Table 5. The table lists all the actions making up A-2 along with a Y (Yes) or N (No) indication as to whether the actions are applied to each of the identified actioned groups.

TABLE 5

|  | Ag-01 | Ag-02 |
|---|---|---|
| A1 | Y | Y |
| A2 | N | N |
| A3 | Y | N |

For A-2 to be self-consistent, all the rows of the Table 5 must be consistent; i.e. any row in the table must be either both Yes or both No. Any row with a Yes and a No means that A-2 is not self-consistent. Therefore, A-2 as shown in Table 5 is not self-consistent. In cases where all overlapped actioned groups for a policy's actions are shown to be consistent, it is concluded that actions are self-consistent and the process continues to step 830. If there is a lack of self-consistency the process branches to step 822 and an alarm is raised to the user of the Auto-IP PDP 220 to take action.

The next step, step 830, checks whether the conditions C-1 and C-2 are overlapping. C-1 and C-2 are overlapping if there is an element that belongs to both C-1 and C-2. That is:

{ElementssatisfyingC11andC12
    and . . . }∩{ElementssatisfyingC21andC22
    and . . . }≠emptyset To simply the checking procedure, one can first perform a logical AND of all the columns in Table 6, to obtain the AND row. If all the entries of the AND row are 1's (true), then C-1 and C-2 are overlapping. If any of the entries in the AND row is a "0" (false), then C-1 and C-2 are non-overlapping, and policies P1 and P2 are determined to be consistent and the process continues to step 850.

TABLE 6

| Conditions | C11 Cell ID | C12 IMSI | C13 APN | C14 Cell congestion | C15 Time Date | C16 Subs. QoS | C17 Neg. QoS |
|---|---|---|---|---|---|---|---|
| C-1 | 1-256 | All | X | Yes | 12-1 pm | 1 | X |
| C-2 | C21 X | C22 1-10 | C23 t.gprs | C24 X | C25 X | C26 <2 | C27 1 |
| AND (columns of C-1, C-2) Conclude C-1 and C-2 are overlapping | 1 | 1 | 1 | 1 | 1 | 1 | 1 |

Figure 8B:
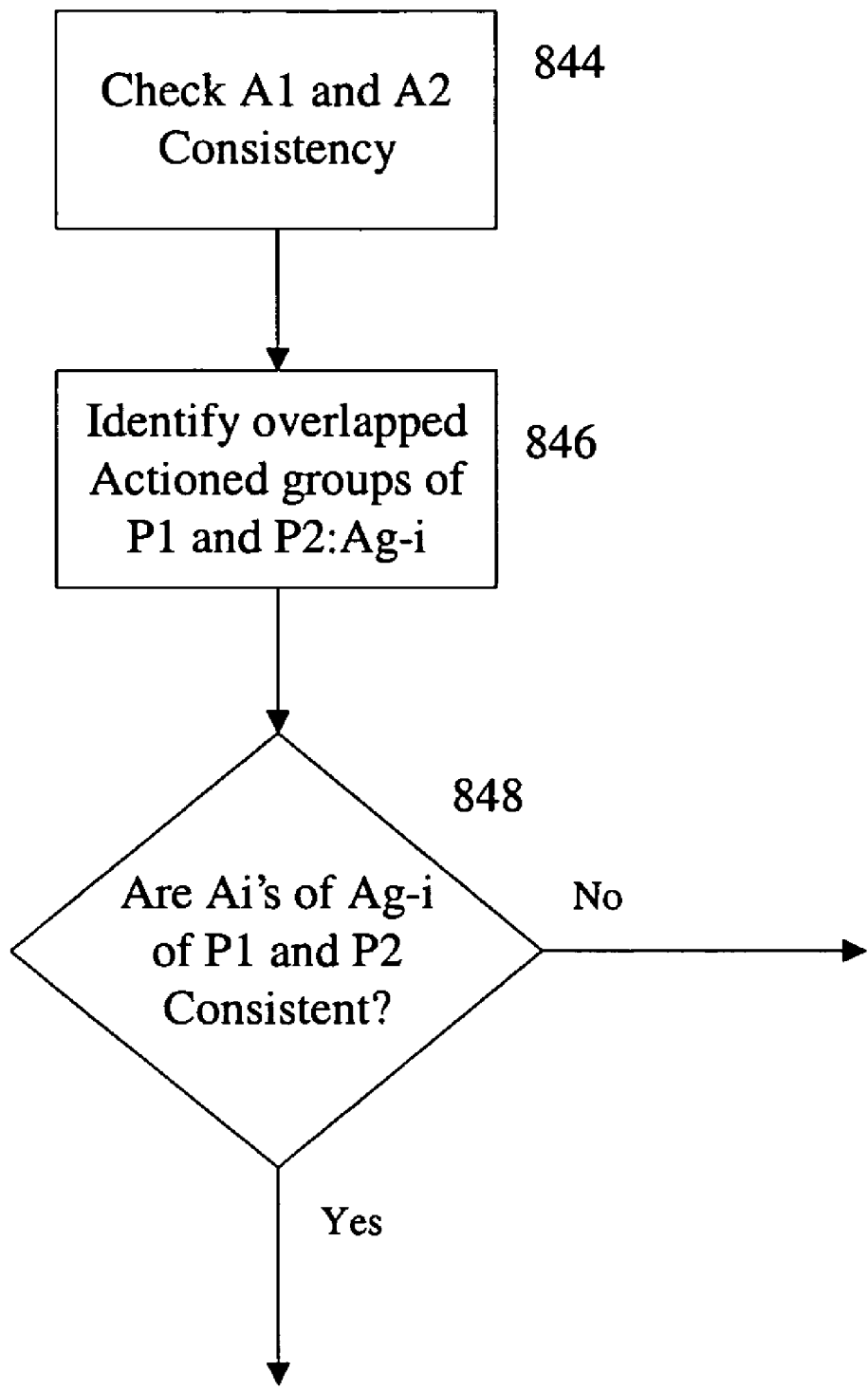

If C-1 and C-2 are overlapping, as shown in the example of Table 6, the algorithm proceeds to step 840 where the A-1 of P1 and the A-2 of P2 are checked for consistency. The sub-steps of step 840 are illustrated in FIG. 8b. At step 844, the consistency of A1 and A2 are checked for consistency by identifying the overlapping Actioned groups Ag-i of P1 and P2 at step 846 and checking if Ai's of Ag-i of P1 and P2 are consistent at step 848. If this test is passed, P2 is consistent with P1 and the process continues to step 850. If the answer at the decision box at step 848 is "no" then policies P1 and P2 are not consistent and the process branches to step 842 where an alarm is raised.

Finally, in step 850 it is determined if all policies have been checked. If not, another existing policy (P1) is selected from the set of existing policies at step 860 and the same checking procedure is repeated from step 820. When all the existing policies have been checked against P2 and no alarm conditions have been raised it is concluded that P2 is consistent with all the existing policies at step 852 and the process terminates at step 854.

The Auto-IP PDP 220 requires a variety of information in order to make decisions. Network configuration information, e.g., the type of each cell (GPRS, EDGE, etc.), provides an upper bound on the total resources available in each cell. The mappings between cells, IP addresses, and mobile subscriber identities allow correlation of cell traffic and congestion state, identification of subscribers' traffic for control at the $G_i$ interface, and identification of the Service Level Agreements for the subscribers in each cell. Service Level Agreements (SLAs) with users identified by mobile subscriber identities provide information on the service level expectations of each user and commitments of the service provider. Information on the congestion state of each cell enables the Auto-IP PDP 220 to determine whether any actions are necessary to meet traffic constraints. Information regarding the quantities of each type of traffic in each cell is necessary to determine traffic state of cells.

In FIG. 2 many of the potential sources for the necessary information are shown. Network information, such as the technology and capacity of each cell, can be configured in the Auto-IP PDP 220 directly, or it could come from an external database (not shown in FIG. 2). The mapping between cells, IP address, and mobile subscriber identities can be obtained at the $G_b$ interface 125 because the mapping information is transferred across the interface during Packet Data Protocol context activation (in GPRS) and when users move between cells. A $G_b$ probe 230 at the $G_b$ interface 125 can extract the mapping information. The mapping information is also available inside the SGSN 140, but is not readily available in real-time. User SLAs can be obtained from a customer database 250 using the mobile subscriber identity as a lookup key. Some subscription information (e.g. "subscribed QoS") may also be available from the Home Location Register (HLR) (not shown in FIG. 2); the interactions between the SGSN 140 and the HLR could be monitored by a probe on the $G_r$ interface (not shown) to collect this subscription information. The HLR can be used as an alternative or supplemental source for subscriber information in addition to the customer database 250.

The congestion state of the cells can be obtained from a RAN Network Management System (NMS) 240 sometimes also referred to as a RAN Element Management System (EMS). The congestion state can also be estimated from traffic and capacity information. Finally, given the mappings between IP addresses, mobile subscriber identities, and cells, one can monitor the traffic at either the $G_b$ interface 125 or the $G_i$ interface 151 to determine the quantities of each type of traffic in each cell to determine the current state of the network.

Auto-IP Traffic Optimizer 210 is a Policy Enforcement Point and is the second main component of the present invention. Traffic optimizations that can be put in a device inserted at the $G_i$ interface of a GPRS or 3G network (or a similar position in a network of a different technology) are described below as various methods that can be employed. Some or all of these methods could be used in an embodiment in accordance with the present invention. Some of the optimizations are applied based on the type of cell the traffic is destined for and/or the traffic and congestion information obtained for each cell via the Auto-IP PDP 220. Others can be applied in a manner independent of the type and status of the cells, just based on properties specific to wireless networks in general.

Figure 9:
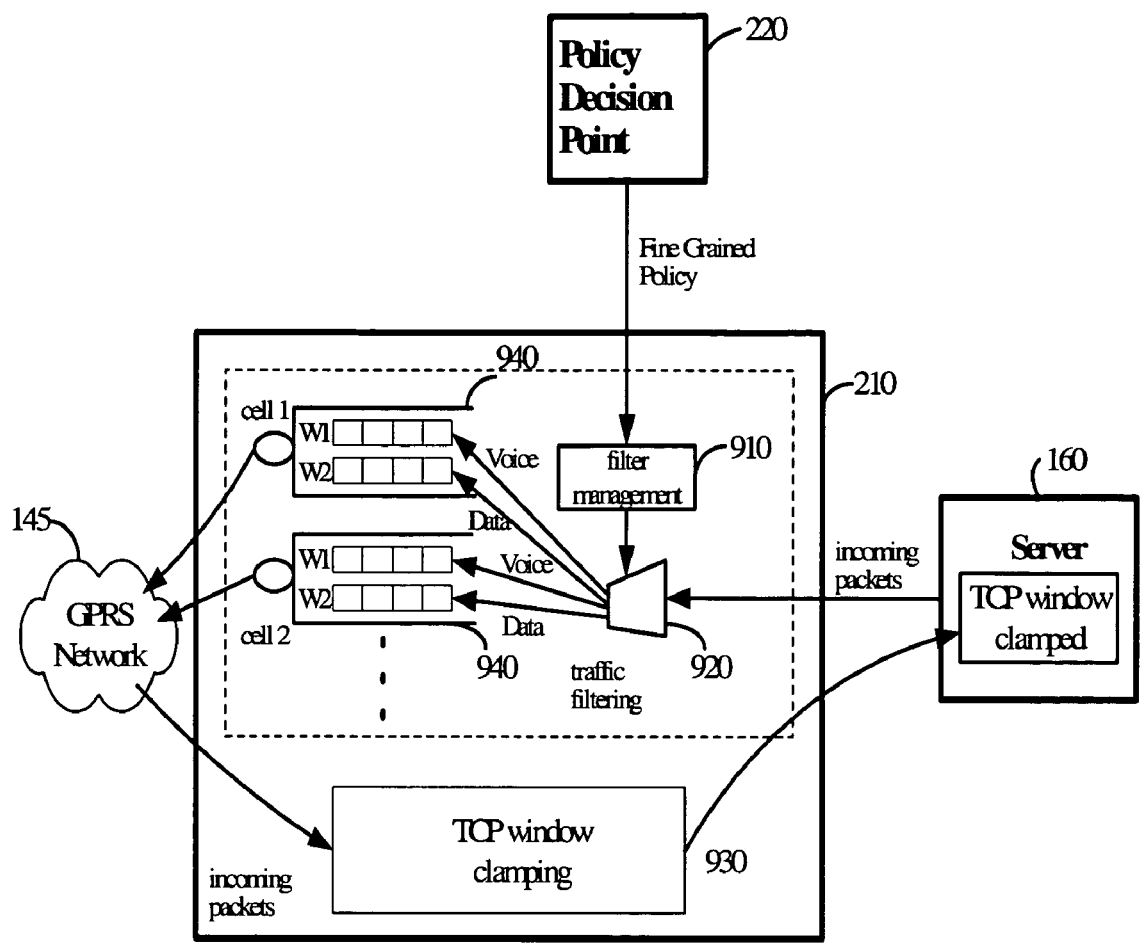
FIG. 9 is a graphical depiction of the Auto-IP Traffic Optimizer.
Figure 10:
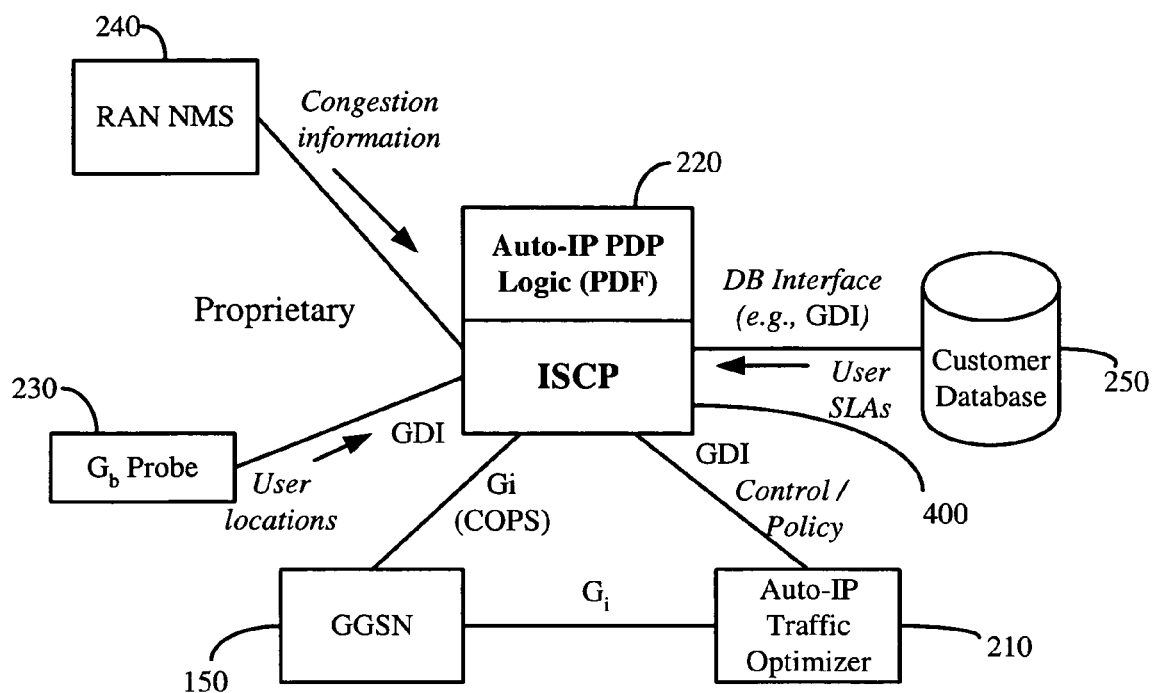
FIG. 10 is a graphical depiction of the present invention implemented using an Intelligent Services Control Point (ISCP).

With the cell-specific traffic and resource information collected by the Auto-IP PDP 220, various optimizations can be applied at the Auto-IP Traffic Optimizer 210 to manage the resources in each cell. FIG. 9 is a graphical depiction of one embodiment of the Auto-IP Traffic Optimizer 210 of the present invention. Policies and user-location mappings are input into the Auto-IP Traffic Optimizer 220 by the Auto-IP PDP 220. Policies and mappings first arrive at a filter management module 910 that interprets the policy and controls traffic filter 920. IP packets of voice and data arrive from server 160 and are separated based on IP addresses and port numbers by traffic filter 920. The traffic filter 920 directs the traffic into the correct queue 940 for its cell (the cell the traffic is destined for) and traffic type. Traffic filter 920 enables the flows to be separated so that various optimization techniques (further described below) can be implemented on a flow-by-flow and cell-by-cell basis thereby providing the fine-grained QoS support necessary. Once the traffic optimization has been performed as dictated by the policy directives following from the Auto-IP PDP 220 the traffic can be sent into the GPRS (or other) network 145 and on to the RAN 135 and the mobile clients 110 as shown in FIG. 2.

Traffic shaping can limit the bandwidth allocated to a particular traffic stream or class of traffic. Traffic shaping can smooth the traffic so that it is less bursty. Traffic shaping can also be combined with scheduling and priority so that resources are allocated more fairly (or less fairly, e.g., giving higher priority to particular traffic classes). In a congested cell (or even in a cell without congestion), the bandwidth of lower priority traffic can be limited so that more bandwidth is available for higher priority traffic. The Auto-IP PDP 220 must configure the traffic shaping based on the total capacity of the cell and on the quantities of each class of traffic put into the network.

TCP Window Clamping is a mechanism to limit the size of the TCP congestion window to prevent buffer growth in a network with a small bandwidth-delay product. Congestion control in TCP uses a windowing mechanism to limit the amount of in-flight data (data that has been sent but not acknowledged); the size of the window (the congestion window size) determines the maximum amount of data that can be in flight at any time. TCP's slow-start and congestion avoidance mechanisms start sessions with a small congestion window and, as packets are successfully transmitted and acknowledged, grow the window up until a configured maximum is reached. This maximum congestion window size is typically 64 Kbytes. The congestion control mechanism allows the sender to transmit one congestion window size of data per round-trip time (the time between sending a packet and receiving its acknowledgement). If the receiver or receiving network processes data at a lower rate, the remainder of the in-flight data must be buffered in the network, adding to network delay.

The optimal size for the TCP congestion window to avoid buffer growth in the network is the bandwidth-delay product, where the bandwidth is the network capacity available to the session and the delay is the round-trip time for a TCP packet sent to the destination host. Clamping (setting a maximum on) the congestion window size can be implemented by replacing the advertised window field in packets (e.g., acknowledgement packets) sent from the receiver (mobile station) to the sender (server). With cell capacity and traffic information, the desired bandwidth is determined for each session and the bandwidth-delay product is computed to select the clamp value. (Note that clamp value must be at least as large as the maximum packet size that can be sent by the sender.) By clamping each session to an appropriate value, its bandwidth is limited and its contribution to buffer growth in the network is limited. The Auto-IP PDP can determine the appropriate clamp value for each TCP session based on the capacity of the cell and the other traffic destined for the cell. For multiple TCP sessions, buffer occupancies continue to add and IP traffic shaping is recommended. TCP window clamping, however, works to optimize use of TCP with respect to GPRS RAN capacity.

An admission control mechanism can be used to prevent too many sessions or sessions requiring too much bandwidth from entering a network with limited capacity. A protocol such as the Session Initiation Protocol (SIP) can be used to request access to the network. The Auto-IP PDP can interact with the SIP server to set the limits on the number of sessions or the total bandwidth of sessions allowed into the network. Because the PDP has information about which users (and their sessions) are in each cell, the limits can be set independently for each cell.

Image data can be compressed to reduce the amount of traffic that must traverse the network. Most image data is already stored in a compressed format such as GIF, JPEG, or PNG. For congested cells or cells with limited bandwidth, images can be intercepted at the Auto-IP Traffic Optimizer 210 and recompressed with a higher compression ratio before being retransmitted to the destination. It may be necessary to use lossy compression algorithms to get more compression— e.g., using a more lossy JPEG format, or reducing the number of colors in GIF color maps.

In addition to cell-specific optimizations, various other wireless-specific optimizations can be implemented in the Auto-IP Traffic Optimizer 210 to improve the performance of the network. TCP Window Clamping (described above) can also be used to limit latency without specific cell knowledge. In a homogeneous network, e.g., all GPRS cells, the maximum capacity of a cell can be used in the bandwidth-delay product to compute the limit on the congestion window. Even when the network is not homogeneous, e.g., a mix of GPRS and EDGE cells, the highest maximum cell capacity can be used to provide some latency reduction, as long as the maximum congestion window is reduced to a level below the default value (usually 64 kbytes).

In a GPRS network, the minimum round trip time is about 0.5 seconds, and the capacity of a cell is around 50 kbps—this leads to a bandwidth-delay product of 3125 bytes. For TCP sessions where the congestion window has grown to its maximum (typically 64 kbytes), the added buffering delay can be close to 10 seconds. The current embodiment of the present invention uses TCP window clamping 930 to reduce the maximum congestion window from 64 kbytes to 3125 bytes. The maximum delay per TCP session is thereby reduced from over 10 seconds to less than 1 second, and approximately full bandwidth is achieved.

TCP ACK spacing as described in RFC 3135 may also be used. In a wireless access network, such as GPRS, TCP acknowledgements (ACKs) tend to bunch together. This leads to bursts of data from the TCP sender due to back-to-back arriving TCP acknowledgements. These bursts periodically (i.e., once per round-trip time) fill the buffers in the access network causing large amounts of jitter, which can hurt the performance of some real-time applications (such as Voice over IP). Jitter is reduced by intercepting the ACKs and resending them with a more regular spacing so that the sender no longer sends data in bursts.

Local TCP acknowledgements as described in RFC 3135 of the IETF may also be used for traffic optimization. The PEP device can acknowledge downstream TCP packets before they are acknowledged by the mobile stations to reduce the round-trip times measured by the sender. This speeds up TCP slow start and congestion avoidance so that the maximum bandwidth is reached sooner at the beginning of a TCP session or after a packet has been lost. Note that if local TCP acknowledgements are generated, the PEP must deal with data recovery when packets are lost in the access network.

Furthermore, local TCP retransmissions as described in RFC 3135 of the IETF may be used. When packets are lost in the access network, the losses can be hidden from the server by suppressing duplicate acknowledgements and/or by sending local TCP acknowledgements from the PEP. This can speed up recovery from lost data because it prevents the server from going into slow start or congestion avoidance. In this case, the PEP must retransmit the lost data because the server is no longer handling the retransmission. The PEP must identify lost packets by maintaining its own timeout mechanisms, and it must store packets until acknowledgements are received. If it detects that a packet was lost, it must retransmit the lost data from its own storage.

Device-specific data reduction is another optimization technique. For mobile devices with small screen sizes, the size of large images can be reduced to fit on the screen. This can substantially reduce the amount of data that needs to be transmitted over the access network, providing faster downloads for the receiver of the data and leaving more bandwidth for other users. The type of mobile device often can be determined from information in HTTP request headers. Images in any unencrypted file format can be shrunk. This optimization can be applied to all traffic, or it could just be applied to traffic destined for cells that are congested or have low capacity.

IP Traffic Shaping and TCP Window Clamping have been implemented in a prototype Auto-IP Traffic Optimizer 210. The traffic shaping is applied on a per-cell basis, and the window clamping is applied with a constant clamp value. The current implementation is based on Linux with packet forwarding (routing) enabled. Traffic shaping has been implemented using Linux's tc command set which provides many options for implementing shaping, scheduling, and priority. The shaping mechanism in the current preferred embodiment is a Hierarchical Token Bucket, which is similar to weighted fair queuing. Within each service class, Stochastic Fair Queuing is used to schedule the sessions. The current implementation of TCP window clamping uses the Linux ip_tables module to intercept the packets and libipq routines to process the packets (replacing the Advertised Window field in packets transmitted upstream from mobile stations).

Customer and service differentiation requires identification of a user or a set of users, and/or the services subscribed. Service differentiation is then provided with respect to quality of service guarantee, access priority, or charging or credit incentives. To identify a user(s) in the mobile context, a set of common attributes as listed in Table 7 is used, where focus is given to GSM/GPRS networks (similar attributes for TDMA networks apply).

TABLE 7

| User Identification | Where is the info stored | Valid duration |
|---|---|---|
| IMSI | MS, HLR, | Static |
| MSISDN | MS, HLR | Static |
| Charging account ID | Charging gateway | Valid when PDP Context is active |
| PPP session login | RADIUS or equivalent | During PPP session |
| IP address | MS, SGSN, GGSN, CGF | Static IP address or Dynamic IP address |
| PDPContext | MS, HLR, CGF, SGSN, GGSN | Dynamic |
| Mobility Context | SGSN, GGSN | Valid when PDP Context is active |
| Access Point Name | MS, HLR, GGSN, SGSN | Static or assigned during PDPsetup |

In Table 7, the left column gives a list of attributes for user identification. The second column tells where the attributes can be found, and the third column indicates whether the user identification attribute is static (i.e. permanently assigned) or dynamic (i.e. assigned when the session (e.g. PDPcontext or PPP session) is active. If the attributes in Table 6 are available, a subset of these attributes can be used for customer differentiation. However, to implement customer and service differentiation, the OSS is required to have the information with respect to how this user identifying attributes are mapped to session and/or IP flows. Knowledge of the mapping is essential because many of the service differentiation mechanisms reside in the session and IP layer. For example, if the IP layer DiffServ QoS control is used for service quality differentiation for all the sessions corresponding to APN=company.gprs.com, one needs to find out all the IP flows corresponding to company.gprs.com. Then DiffServ QoS (Code points) can be assigned with respect to the IP flows corresponding to company.gprs.com Acquiring the mapping between user identifying attributes and network entities such as IP flows is straightforward if the IP address is static. In that case, the IP address is provisioned for a specific mobile station and does not change. However, in the mobile environment, it is very common, and necessary before Ipv6 is fully deployed, that dynamic address assignment is supported. In dynamic address assignment, via DHCP, an IP address is assigned to an MS when a PDPContext is created, and the assigned IP address may be released at the end of the PDP session. (Note that the fact the Network Address Translation (NAT) may be used at the GGSN does not change the need for support of DHCP.) Therefore, the mapping information exists during the PDPContext setup process, and is available at the SGSN and GGSN. The mapping is also available in the Call Detail Record (CDR) and thus will be captured in CDR mediation devices. Similarly, the mapping is also recorded in accounting databases such as RADIUS. In fact the RADIUS MIB defined such mapping. Unfortunately accessing to the user ID to IP address mapping is still a challenge. For SGSN and GGSN, although the mapping is there, it is normally not made available to external devices. For CDR and RADIUS, which are normally used for supporting accounting, the information is usually retrievable after the session is closed or in a non-real-time fashion. The time lag in retrieving the mapping renders them useless, as many of the QoS controls require real-time capability. The difficulty in obtaining the mapping information in a timely fashion is the reason a $G_b$ probe, which should be a real-time or near-real-time device, is selected as the preferred mechanism for obtaining the user (IMSI)-location-IP address mapping.

The system and method of the present invention can be implemented using an Intelligent Service Control Point (ISCP), such as the Telcordia ISCP, in accordance with the embodiment disclosed in FIG. 9. The ISCP 400 can be used as a platform for executing the algorithms that form the logic of the Auto-IP PDP 220. The existing Generic Data Interface (GDI) as specified in Telcordia SR-3389 "ISCP Generic Data Interface Specification for TCP/IP" and/or vendor-specific proprietary interfaces can be used to input information from the RAN NMS 240, Gb probe 230 and Customer Database 250 as described above. The ISCP 400 executes the automatic policy generation and consistency checking algorithms described above and communicates with the Auto-IP Traffic Optimizer 210 through either the GDI or vendor-specific proprietary interface thereby passing the policy control directives to the Auto-IP Traffic Optimizer 210 which in turn performs optimization techniques described above on a cell-by-cell basis. ISCP 400 can also communicate directly with the GGSN 150 through the $G_o$ or COPS interfaces as defined by the IETF.

The above description has been presented only to illustrate and describe the invention. It is not intended to be exhaustive or to limit the invention to any precise form disclosed. Many modifications and variations are possible in light of the above teaching. For example, in addition to use in 2.5G General Packet Radio Service (GPRS) and 3G UMTS networks the present method and system can be used in Enhanced Data for GSM Evolution (EDGE), as well as the code Division Multiple Access (CDMA) Radio Transmission Technology (1xRTT) networks. The applications described were chosen and described in order to best explain the principles of the invention and its practical application to enable others skilled in the art to best utilize the invention on various applications and with various modifications as are suited to the particular use contemplated.

We claim:

1. In a mobile telecommunications network in which a plurality of mobile stations communicate through a radio access network (RAN) through a network having at least one Serving GPRS Support Node (SGSN) and at least one Gateway GPRS Support Node (GGSN) through the Internet to a plurality of servers, a system for the automatic optimization of traffic comprising:
    one or more Gb probes for extracting information from an interface between the RAN and the SGSN including the identity of each user associated with a specific data flow;
    a network management system (NMS) for providing congestion and traffic information from the RAN;
    one or more IP probes for providing information regarding quantities and types of IP traffic and delays between the mobile stations and the interface;
    a customer database for providing information regarding the type and quality of service for each user of a mobile station;
    a policy decision point for automatic generation of policy actions to optimize traffic for each data flow on a cell-by-cell basis, said policy decision point using a finite state machine working in conjunction with an n-dimensional traffic model and information from the Gb probes, the NMS and the customer database to determine said policy actions; and,
    a traffic optimizer for implementing the policy actions determined by the policy decision point.

2. The system of claim 1 wherein said n-dimensional traffic model is partitioned into a set of non-overlapping sub-regions corresponding to different states in the finite state machine and predefined policies allow transition between the different states in an automated fashion and each slate transition accompanies a set of Auto-IP actions executed in the traffic optimizer.

3. The system of claim 1 wherein the policy decision point further comprises a means for checking the consistency of new policies with existing policies.

4. The system of claim 1 wherein the traffic optimizer separates traffic arriving from the Internet into components identified by the identity of the cell in the RAN through which the traffic will pass.

5. The system of claim 4 wherein the separated traffic is optimized on a cell-by-cell basis using optimization techniques selected from the group consisting of: TCP window clamping, admission control mechanisms, compression, TCP ACK spacing, local TCP acknowledgements, IP Traffic shaping, and local TCP retransmissions.

6. The system of claim 1 wherein the traffic optimizer is located at the $G_i$ interface.

7. A method for automatic optimization of traffic flow between users of mobile stations and servers connected through a radio access network (RAN), a packet-based core network and the Internet comprising the steps of:
    extracting information from the interface between the RAN and the packet-based network including the identity of each user associated with a specific traffic flow;
    collecting information from a network management system (NMS) regarding congestion and traffic information from the RAN;
    collecting information from one or more IP probes regarding quantities and types of IP traffic and delays between mobile stations and a Gi interface;
    retrieving data from a customer database regarding the type and quality of service for each user of a mobile station;
    inputting the extracted RAN information, collected NMS information, and retrieved customer data into a policy decision point;
    determining at the policy decision point policy actions to optimize traffic for each data flow on a cell-by-cell basis, said determining based on a finite state machine and an n-dimensional traffic model; and,
    implementing the actions on a traffic optimizer on a cell-by-cell basis.

8. The method of claim 7 wherein the step of determining the actions further comprises:
    identifying total quantity of a resource to be managed and a set of traffic classes sharing the resource;
    converting the set of traffic classes into an n-dimensional space where n is the number of traffic classes, and the axes represent amounts of traffic of each class;
    partitioning the n-dimensional space into regions representing conditions of the network for which traffic constraints are met or not met, wherein each state corresponds to a subset of traffic regions of the n-dimensional space;
    for each state not meeting traffic constraints, identifying a set of actions for moving the network into another state meeting the traffic constraints;
    creating a state transition diagram with nodes representing each of the traffic regions and with edges between the nodes representing adjacent regions; and
    labeling each edge with the type of traffic that causes the transition, and for the edges that move the network from an unacceptable state to an acceptable state, labeling the edge with the name of the action that causes the transition.

9. The method of claim 7 wherein the step of determining the actions to be taken further comprises checking the consistency of new policies with existing policies.

10. The method of claim 7 further comprising the step of separating traffic arriving from the Internet at the traffic optimizer into components identified by the identity of the cell in the RAN through which the traffic will pass.

11. The method of claim 10 wherein the separated traffic is optimized on a cell-by-cell basis using optimization techniques selected from the group consisting of: TCP window clamping, admission control mechanisms, compression, TCP ACK spacing, local TCP acknowledgements, IP Traffic shaping, and local TCP retransmissions.

* * * * *

UNITED STATES PATENT AND TRADEMARK OFFICE
CERTIFICATE OF CORRECTION

| | |
|---|---|
| PATENT NO. | : 7,466,652 B2 |
| APPLICATION NO. | : 10/918256 |
| DATED | : December 16, 2008 |
| INVENTOR(S) | : Lau et al. |

It is certified that error appears in the above-identified patent and that said Letters Patent is hereby corrected as shown below:

On the Title Page, in Item (57), under "ABSTRACT", in Column 2, Line 22, delete "Auto IP-PDP" and insert -- Auto-IP PDP --, therefor.

In the Specification

In Column 2, Line 15, delete "years" and insert -- years. --, therefor.

In Column 3, Line 44, delete "service" and insert -- service. --, therefor.

In Column 9, Line 8, delete "an non-sub-optimal" and insert -- a non-sub-optimal --, therefor.

In Column 11, Line 33, delete "Company.gprs.com" and insert -- Company.gprs.com. --, therefor.

In Column 12, Line 1, delete "Auto IP-PDP" and insert -- Auto-IP PDP --, therefor.

In Column 14, Line 55, delete "Optimizer 220" and insert -- Optimizer 210 --, therefor.

In Column 17, Line 43, in Table 7, delete "HLR," and insert -- HLR --, therefor.

In Column 18, Line 6, delete "company.gprs.com" and insert -- company.gprs.com. --, therefor.

In Column 18, Line 47, delete "Gb probe" and insert -- $G_b$ probe --, therefor.

In the Claims

In Column 19, Line 14, in Claim 1, delete "Gb probes" and insert -- $G_b$ probes --, therefor.

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 7,466,652 B2

In Column 19, Line 29, in Claim 1, delete "Gb probes," and insert -- $G_b$ probes, --, therefor.

In Column 19, Line 38, in Claim 2, delete "slate" and insert -- state --, therefor.

In Column 20, Line 9, in Claim 7, delete "Gi interface;" and insert -- $G_i$ interface; --, therefor.